(12) United States Patent
Cicchiello

(10) Patent No.: US 7,190,907 B2
(45) Date of Patent: Mar. 13, 2007

(54) DYNAMIC OPTICAL TAG

(75) Inventor: James M. Cicchiello, Cary, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 583 days.

(21) Appl. No.: 10/765,659

(22) Filed: Jan. 27, 2004

(65) Prior Publication Data

US 2005/0163511 A1    Jul. 28, 2005

(51) Int. Cl.
*H04B 10/00* (2006.01)
(52) U.S. Cl. .................... 398/170; 342/45; 455/106
(58) Field of Classification Search ............ 398/170; 455/106, 107, 42; 342/6, 44, 45; 340/572.1, 340/572.7, 539.13, 825.49, 10.1, 505, 557, 340/942

See application file for complete search history.

(56) References Cited

U.S. PATENT DOCUMENTS

| | | | |
|---|---|---|---|
| 4,109,247 A | 8/1978 | Kaplan | |
| 4,724,427 A | 2/1988 | Carroll | |
| 4,746,830 A | 5/1988 | Holland | |
| 4,885,571 A | 12/1989 | Pauley et al. | |
| 4,897,642 A | 1/1990 | DiLullo et al. | |
| 4,952,913 A | 8/1990 | Pauley et al. | |
| 4,952,928 A | 8/1990 | Carroll et al. | |
| 5,014,206 A | 5/1991 | Scribner et al. | |
| 5,051,741 A | 9/1991 | Wesby | |
| 5,266,944 A | 11/1993 | Carroll et al. | |
| 5,350,134 A * | 9/1994 | Crawford ............... 244/3.16 | |
| 5,355,241 A * | 10/1994 | Kelley ................... 398/170 | |
| 5,396,277 A | 3/1995 | Gast et al. | |
| 5,486,830 A | 1/1996 | Axline, Jr. et al. | |
| 5,525,993 A | 6/1996 | Pobanz et al. | |
| 5,565,858 A | 10/1996 | Guthrie | |
| 5,602,538 A | 2/1997 | Orthmann et al. | |
| 5,627,517 A | 5/1997 | Theimer et al. | |
| 5,629,691 A | 5/1997 | Jain | |
| 5,629,981 A | 5/1997 | Nerlikar | |
| 5,640,151 A | 6/1997 | Reis et al. | |
| 5,666,647 A | 9/1997 | Maine | |
| 5,686,902 A | 11/1997 | Reis et al. | |
| 5,712,899 A | 1/1998 | Pace, II | |
| 5,751,246 A | 5/1998 | Hertel | |
| 5,767,802 A * | 6/1998 | Kosowsky et al. ......... 342/45 | |
| 5,774,876 A | 6/1998 | Woolley et al. | |
| 5,798,693 A | 8/1998 | Engellenner | |
| 5,804,810 A | 9/1998 | Woolley et al. | |
| 5,819,164 A * | 10/1998 | Sun et al. ............... 455/106 | |

(Continued)

OTHER PUBLICATIONS

Hamamatsu InGaAs Pin Photodiode Oct. 2001, Japan.

*Primary Examiner*—Thomas Mullen
(74) *Attorney, Agent, or Firm*—Stetina Brunda Garred & Brucker

(57) ABSTRACT

An optical tag, having a photo-detector, a controller, a piezoelectric translator, a battery and a retro-reflective tape. The photo-detector is responsive to an optical energy at a predetermined wavelength, and the controller is connected to the output of the photo-detector. The piezoelectric translator connected to controller is also connected to the battery when the photo-detector responds to the optical energy. The retro-reflective tape is directly mounted on the piezoelectric translator. When the connection between the piezoelectric translator and the battery is established, a pulse is generated and applied to the retro-reflective tape. Therefore, the optical energy incident on the retro-reflective tape is modulated by the pulse and retro-reflected by the retro-reflective tape.

37 Claims, 3 Drawing Sheets

U.S. PATENT DOCUMENTS

| | | |
|---|---|---|
| 5,822,683 A | 10/1998 | Paschen |
| 5,831,519 A | 11/1998 | Pedersen et al. |
| 5,856,788 A | 1/1999 | Walter et al. |
| 5,872,520 A | 2/1999 | Seifert et al. |
| 5,890,068 A | 3/1999 | Fattouche et al. |
| 5,892,441 A | 4/1999 | Woolley et al. |
| 5,894,266 A | 4/1999 | Wood, Jr. et al. |
| 6,049,278 A | 4/2000 | Guthrie et al. |
| 6,329,944 B1 | 12/2001 | Richardson et al. |
| 6,744,367 B1 * | 6/2004 | Forster .................... 340/572.7 |

* cited by examiner

DYNAMIC OPTICAL TAG

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates in general to an optical tag, and more particularly, the present invention provides a small, thin, environmentally robust, long-lived, modulated optical retro-reflecting tag and a long range interrogation system.

Tagging technology provides a means to covertly but unambiguously mark a person, target or location so that it may be identified from a distance with a specialized sensor. The use of a tag greatly eases or eliminates target detection, identification, and discriminating problems. For example, in a precision strike application, a tag is applied to a vehicle or location in advance of the strike and a sensor (possibly organic to the strike weapon) uses the tag to simplify the process of finding and identifying the target. This allows for an autonomous terminal engagement even with initial uncertainty in the target location. However, many tagging devices depend on omni-directional radio frequency (RF) signals that can be intercepted or jammed. Therefore, other tagging devices relying on laser-based free-space-optical (FSO) communication have also been proposed, including ferroelectric liquid crystal modulator, micro-electromechanical (MEM) based corner cube, multiple quantum well retro-reflector, and thin-film diffractive modulating retro-reflector.

The ferroelectric liquid crystal modulator is a mature technology that provides wide field of view (FOV), wide operation wavelength differential $\Delta\lambda$, and low operation power. However, the ferroelectric liquid crystal modulator has the limited flexibility of liquid crystal display, a narrow operation temperature range between $-10°$ C. to $60°$ C., and a low switching speed of about several kilobytes per second. The micro-electromechanical corner cube has a good contrast and requires very low operation power, but has limited switching speed and surface flatness, a small clear aperture and the very high fabrication cost. The multiple quantum-well retro-reflector has the advantages of high data rate of about several megabytes per second, a wavelength range safe to human eyes, and low operation power. However, it also has the disadvantages of narrow waveband, low modulation depth of about 1 dB, a small clear aperture (with a diameter smaller than 1 cm), and a high fabrication cost. The thin-film diffractive modulating retro-reflector provides the ultra-thin (about 1 mm) dimension, low cost, and modulation capability, but has the limitations of low reflection efficiency, a small field of view and a narrow optical bandwidth.

It is thus a substantial need to develop a non-RF dependent and non-visually-alerting optical tag which has a wide range of operation temperature, low operation power and low fabrication cost.

BRIEF SUMMARY OF THE INVENTION

The present invention provides an optical tap which provides a laser-based free-space-optical communication between remote identities such as airborne platforms and unattended ground sensors or airborne platforms and soldiers on the ground. Such communication has a low probability of being intercepted or jammed. The optical tap can be fabricated inexpensively by commercially available components. In addition, the optical tag is physically small, but is efficient in power.

In one embodiment of the present invention, the optical tag comprises a photo-detector, a controller, a piezoelectric translator, a battery and a retro-reflective tape. The photo-detector is responsive to an incident optical energy at a predetermined wavelength, and the controller is in electric communication with the output of the photo-detector. The piezoelectric translator is electrically connected to the controller which controls the electrical connection between the piezoelectric translator and the battery. The retro-reflective tape is in mechanical communication with on the piezoelectric translator. Preferably, the optical energy is a continuous optical wave. The photo-detector includes an indium gallium arsenide PIN photodiode. The predetermined wavelength is about 1.55 µm, for example.

The optical tag may further comprise a filter disposed on the photo-detector. The filter has a narrow bandpass at the predetermined wavelength, such that extraneous radiation or beams such as sun can be blocked from being input to the photo-detector. Upon receiving the optical energy, the photo-detector is operative to generate a photocurrent. The photocurrent is then fed to the controller to establish an electric connection between the piezoelectric translator and the battery. Once the connection between the piezoelectric translator and the battery is established, the piezoelectric translator expands and contracts periodically to generate a stroke to the retro-reflective tape directly mounted thereon. The stroke of the retro-reflective tape then modulates the phase of the optical energy incident thereon; and therefore, the phase modulation provides a specific identification code.

The optical tag may further comprise a Fresnel lens placed above the retro-reflective tape. Preferably, the retro-reflective tape is located at a focal point of the Fresnel lens. Therefore, the optical energy can thus be concentrated onto the retro-reflective tape, and the intensity of the retro-reflected beam is thus increased. Preferably, the photo-detector, the controller, the piezoelectric translator, the battery, and the retro-reflective tape are enclosed by an enclosure having a length of about 30 mm, a width of about 25 mm and a height of about 5 mm.

The present invention further provides an optical tag comprising a piezoelectric translator and a retro-reflective tape. The piezoelectric translator is operative to generate a pulse when an optical energy at a predetermined wavelength is incident on the optical tag. The retro-reflective tape is placed on and directly in contact with the piezoelectric translator, such that the pulse generated by the piezoelectric translator is applied to the retro-reflective tape. Therefore, when the optical energy is incident onto the retro-reflective tape, the optical energy is modulated with an identification code according to the pulse and retro-reflected by the retro-reflective tape. The identification code, that is, the modulation of the retro-reflected optical energy can be programmed in various ways. For example, by changing the material, thickness, or area of the piezoelectric material and the retro-reflective tape, an optical tag operative to retro-reflect an incident optical energy with a unique identification can be fabricated.

In one embodiment, the optical tag further comprises an amplifier operative to amplify the photocurrent, an interface to decode data contained in the photocurrent, and a data retrieval device operative to retrieve the data. The data retrieval device includes an earpiece or a display.

An interrogating system is also provided by the present invention. The interrogating system comprises an interrogating beam source and an optical tag. The interrogating beam source is operative to scan an interrogating beam with a predetermined wavelength through a field. The optical tag is operative to respond the optical signal with an identification code. The optical tag comprises a piezoelectric translator operative to generate a pulse for modulating the optical signal, and a retro-reflective tape, operative to modulate the optical signal with the identification code according to the pulse and retro-reflect the modulated optical signal back to the interrogating beam source. Preferably, the interrogating beam source includes a laser beam source with a wavelength of about 1.55 µm. The interrogating beam source is placed in an airborne platform to scan a field, in which a target holding or mounted with the optical tag is traveling.

The present invention further provides a method of interrogating a target from an airborne platform comprising the following steps. An optical signal at a predetermined wavelength is generated and incident on an optical tag. The optical signal is converted into a photocurrent, which then generates a pulse. The optical signal is then modulated by the pulse and retro-reflected. In the above method, a photo-detector is provided to receive the optical signal and to generate the photocurrent. A piezoelectric translator is provided and activated by the photocurrent to generate the pulse. A retro-reflective tape is in contact with the piezoelectric translator, such that the pulse generated by the piezoelectric translator is applied on the retro-reflective tape to generate a periodical displacement thereof. When the optical signal is incident on the retro-reflective tape, the phase of the optical signal is thus modulated by the periodic displacement of the retro-reflective tape. The phase modulation of retro-reflected optical signal thus provides the airborne platform a reflected optical signal with an identification code. To generate the pulse, an electrical connection between the piezoelectric translator and a battery is established by the photocurrent.

DETAILED DESCRIPTION OF THE INVENTION

Figure 1:
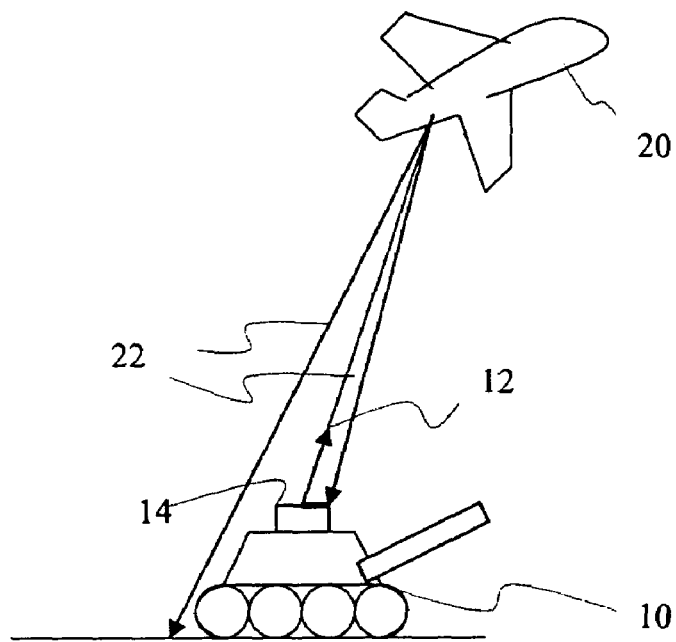
FIG. 1 shows an interrogating system provided by the present invention.

The present invention provides a small and inexpensive optical tag operative to respond a specific optical signal generated by an overhead flier or airborne platform. FIG. 1 shows an interrogating system including such optical tag. As shown, the interrogating system includes an airborne platform 20 such as an unmanned aerial vehicle (UAV) to continuously scan a field with an optical signal 22, preferably a 1.55 µm laser beam. When a target 10 in the field having an optical tag 14 programmed to respond to the optical signal 22 with an identification code is scanned by the optical signal 22, a retro-reflection containing the identification code provided by the optical tag 22 is received by the airborne platform 20. When the retro-reflection is received, the scan process is interrupted, and the airborne platform 20 returns to the point where the retro-reflection was received to interrogate the optical tag 10. In the battlefield application, when a link with the optical tag 14 is acquired, and the target 10 is recognized as being friendly from the identification code, the target 10 is then protected from being fired on by the airborne platform 20.

Figure 2:
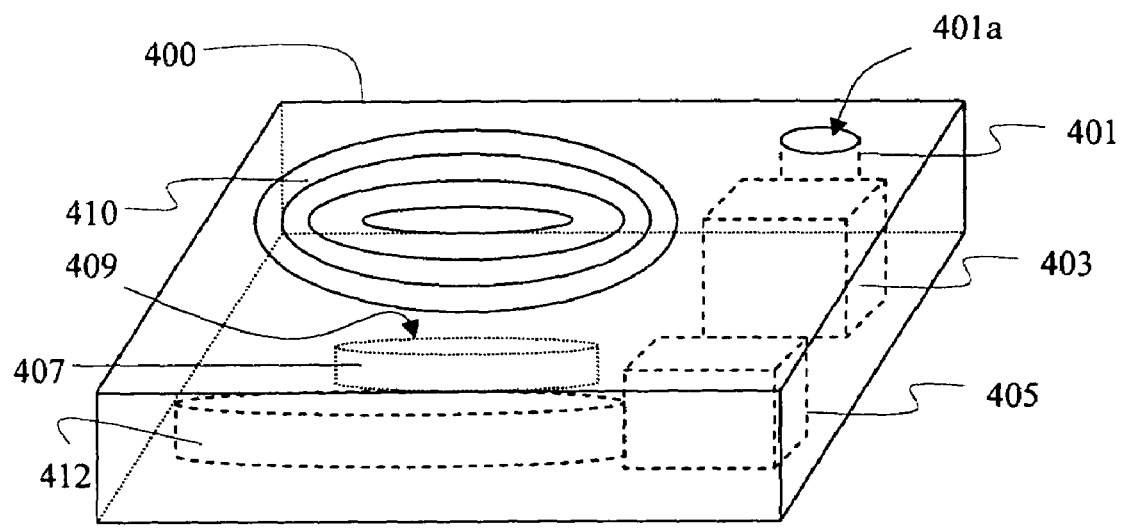
FIG. 2 shows a schematic drawing of an optical tag used in the interrogating system as shown in FIG. 1.
Figure 3:
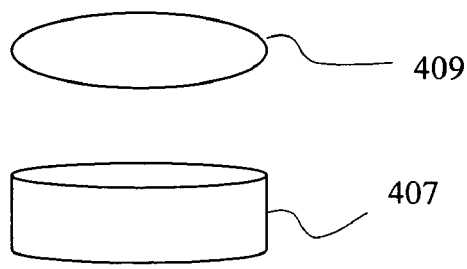
FIG. 3 shows a local enlargement of FIG. 2.
Figure 4:
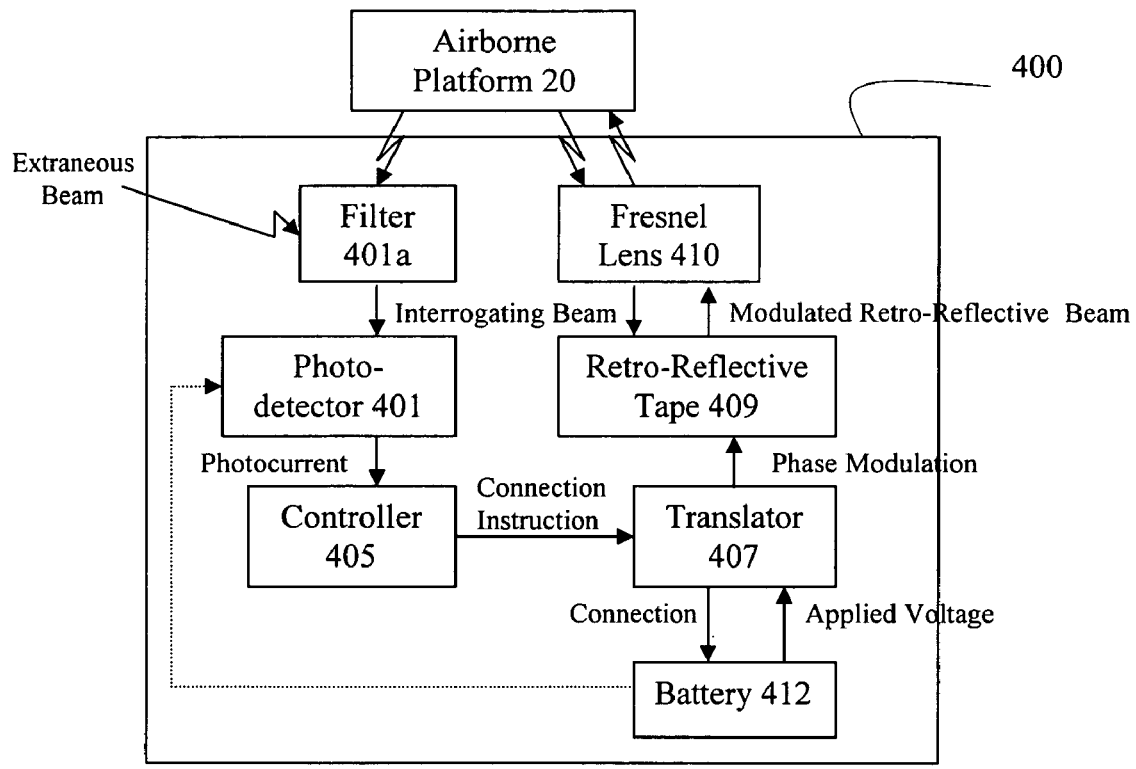
FIG. 4 shows a block diagram of the interrogating system as shown in FIG. 1.
Figure 5:
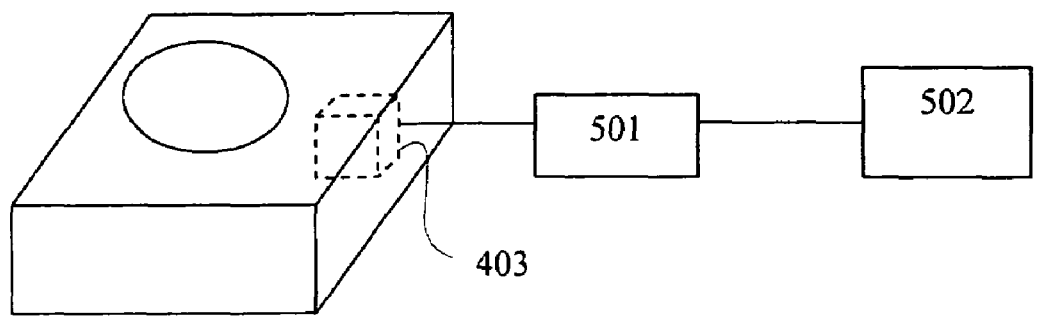
FIG. 5 shows another embodiment of the optical tag.

FIG. 2 shows a schematic drawing of the optical tag 14, FIG. 3 shows a local enlarged view of the optical tag 14, and FIG. 5 shows the functional block diagram of the optical tag 14. As shown in FIG. 2, the optical tag 14 comprises a photo-detector 401, an amplifier 403, a controller 405, a piezoelectric translator 407, a retro-reflective tape 409, a Fresnel lens 410, and a battery 412 encased in an enclosure or a housing 400. In this embodiment, the enclosure 400 is a cuboid having a length of about 30 mm, a width of about 25 mm, and a height of about 5 mm. It is appreciated that the enclosure 400 can also be configured into other shapes such as cylinder according to specific requirement. The enclosure 400 is preferably fabricated from light weight material such as hard plastic.

The photo-detector 401 includes an indium gallium arsenide (InGaAs) PIN photodiode with high responsivity at the wavelength of the optical signal 22 output from the airborne platform 20. In this embodiment, the photo-detector 401 is highly responsive at about 1.55 µm. Preferably, a filter 401a with a narrow bandpass at 1.55 µm is mounted on the photo-detector 401, such that the photo-detector 401 will not be activated or responsive to extraneous light sources such as the sun. It will be appreciated that photo-detectors other than the InGaAs PIN photodiode can also be applied without exceeding the scope and spirit of the present invention. The responsivity of the photo-detector 401 and the bandpass of the filter 401a depend on the characteristics of the interrogating beam 22 output from the airborne platform 20. When the optical signal 22 transmits through the filter 401a and is received by the photo-detector 401, the optical tag 14 is awakened from a sleep mode, and a photocurrent is generated by the photo-detector 401. The photo-detector 401 may also be electrically connected to the battery 409.

The photocurrent generated by the photo-detector 401 is fed into a controller 405. The controller 405 is operative to amplify the photocurrent and instruct the piezoelectric translator 407 to connect with the battery 412. In this embodiment, the battery 412 is preferably a commercially-available lithium (Li) coin battery with a diameter of about 16 mm and a height of about 3 mm. Currently, the duration of the battery 412 is about 120 hours. Once the piezoelectric translator 407 is connected to the battery 412, an applied voltage is drawn from the battery 412 to the piezoelectric translator 407. The piezoelectric translator 407 expands and contracts in response to the applied voltage.

As shown in FIGS. 2 and 3, the retro-reflective tape 409 is directly mounted on a top surface of the piezoelectric translator 407. Therefore, when the voltage is applied to the piezoelectric translator 407, the piezoelectric translator 407 expands and contracts as a piston to pulse the retro-reflective tape 409 with a specific stroke. When the optical tag 14 is scanned by the optical signal 22, the stroke of the retro-reflective tape 409 modulates the phase of the optical signal 22 incident on the retro-reflective tape 409 and retro-reflects the modulated optical signal 12 back to the airborne platform 20. The modulated retro-reflected beam can then be translated to a data stream within the airborne platform 20. Data-rate throughput of about 100 kb/s that suggests an acoustic approach is often required in the interrogating system. In a coherent-detection scheme with a wavelength of about 1.55 µm, a stroke of 0.75 µm of the retro-reflective tape 409 will meet with the acoustic requirement.

As the retro-reflective beam is modulated by the pulse generated by the piezoelectric translator 407 and transferred to the retro-reflective tape 409, the modulation can be altered by changing the material, thickness and/or area of the piezoelectric translator 407 and the retro-reflective tape 409. As a consequence, a retro-reflected beam modulated with different identification code can be obtained.

As shown in FIG. 2, the optical tag 14 further comprises a Fresnel lens 410 above the retro-reflective tape 409. The retro-reflective tape 409 is placed on the focal point of the Fresnel lens 410, such that the incident optical signal 22 will be focused on the retro-reflective tape 409. Therefore, more energy of the optical signal 22 will be concentrated on the retro-reflective tape 409. The area of the retro-reflective tape 409 is designed with sufficient area such that a reasonable field of regard is provided. In addition, the Fresnel lens 410 is a small, low-cost element that meets with the size, weight and power (SWAP) requirements of the optical tag 14.

In addition to the identification function as described above, the optical tag may further provide data or information retrieval function. When an optical signal 22 containing certain data or information is incident onto the photo-detector 401, the optical signal 22 received by the photo-detector 401 is converted into the photocurrent and amplified by the amplifier 403. An interface 501 is used to connect with the amplifier 403. The interface 501 is operative to decode or demodulate the information or data contained in the optical signal 22 into an audio format or readable format. For example, the interface 501 may further connect to an earpiece 502 worn by a soldier, such that the instruction given by the airborne platform 20 can be delivered by to the soldier. Alternatively, the target 10 such as a vehicle or the soldier may hold a data retrieval device 502 such as a display or a printer connected to the interface.

Figure 6:
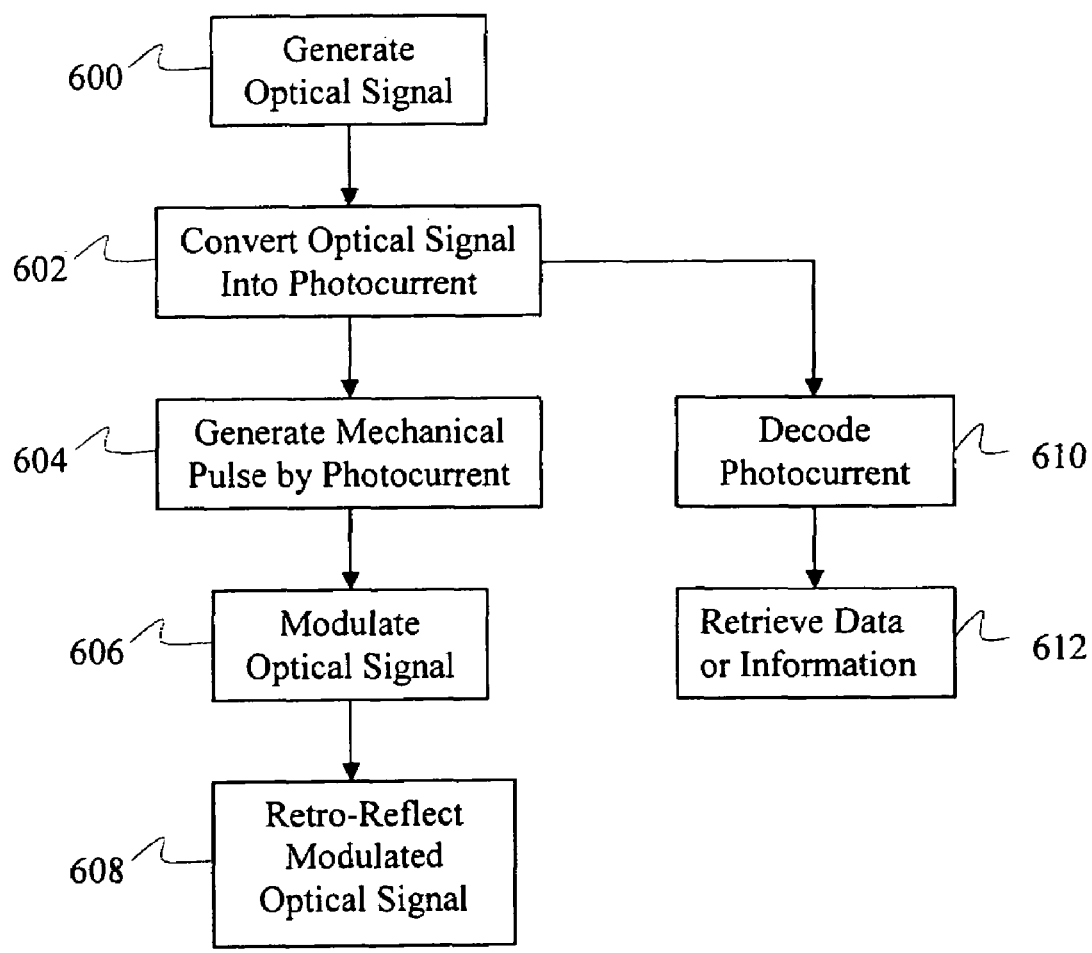
FIG. 6 is a flow chart showing an interrogating method based on free-space communication.

The present invention further provides a method of interrogating an object in a field as shown in FIG. 6. In step 600, an interrogating beam with a predetermined wavelength is generated from a source. In one embodiment, the interrogating beam includes a 1.55 µm laser beam located in an airborne platform flying over a field. The airborne platform is operative to scan the interrogating beam through the field. Once an object such as a vehicle or a soldier wearing an optical tag is moving in the field, the interrogating beam received by the optical tag is converted into a photocurrent in step 602. The step of converting the interrogating beam into the photocurrent includes providing a photo-detector to generate the photocurrent when the interrogating beam is received thereby. In step 604, a piezoelectric translator is then activated by the photocurrent to generate a mechanical pulse. The pulse is then transferred to a retro-reflective tape onto which the interrogating beam is focused by a Fresnel lens. The incident and focused interrogating beam is then modulated with an identification code by the retro-reflective tape according to the pulse in step 606. In step 608, the interrogating beam modulated with the identification code is the retro-reflected to the interrogating beam source.

Preferably, the method of interrogating an object in a field from an airborne platform further includes the steps of retrieving information or data contained in the interrogating beam, such that the soldier is not only able to respond the interrogating beam with the identification code, but is also able to read or listen to the instruction or command given by the airborne platform. For example, in step 610, an interface is connected to the optical tag for decoding the information or data contained in the photocurrent. The decoded data or information is then retrieved by an earpiece or a display in step 612.

This disclosure provides exemplary embodiments of an optical tag. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. An optical tag, comprising:
   a) a photo-detector responsive to an incident optical energy at a predetermined wavelength;
   b) a controller in electrical communication with the photo-detector;
   c) a piezoelectric translator in electrical communication with the controller;
   d) a battery in electrical communication with the piezoelectric translator; and
   e) a reflective tape in mechanical communication with the piezoelectric translator.

2. The optical tag of claim 1, wherein the reflective tape includes a retro-reflective tape to reflect the optical energy along a path that the optical energy is incident.

3. The optical tag of claim 1, wherein the optical energy is a continuous optical wave.

4. The optical tag of claim 1, wherein the photo-detector includes an indium gallium arsenide PTN photodiode.

5. The optical tag of claim 1, wherein the predetermined wavelength is about 1.55 µm.

6. The optical tag of claim 1, further comprising a filter disposed on the photo-detector.

7. The optical tag of claim 6, wherein the filter has a narrow bandpass at the predetermined wavelength.

8. The optical tag of claim 1, wherein the photo-detector is operative to generate a photocurrent upon reception of the optical energy.

9. The optical tag of claim 8, wherein the photocurrent generated by the photo-detector is output to the controller.

10. The optical tag of claim 9, wherein the battery is operative to supply an electric power to the piezoelectric translator when the photocurrent is input to the controller.

11. The optical tag of claim 1, wherein the piezoelectric translator is operative to expand and contract while being connected to the battery.

12. The optical tag of claim 1, wherein the piezoelectric translator is operative to generate a stroke with a predetermined length to the retro-reflective tape while being connected to the battery.

13. The optical tag of claim 12, wherein the predetermined length is about 0.75 µm.

14. The optical tag of claim 12, wherein the retro-reflective tape is operative to receive and modulate the optical energy according to the stroke generated by the piezoelectric translator.

15. The optical tag of claim 14, wherein the retro-reflective tape is operative to retro-reflect the modulated optical energy.

16. The optical tag of claim 1, further comprising a Fresnel lens above the retro-reflective tape.

17. The optical tag of claim 16, wherein the retro-reflective tape is located at a focal point of the Fresnel lens.

18. The optical tag of claim 1, further comprising an enclosure enclosing the photo-detector, the controller, the piezoelectric translator, the battery, and the retro-reflective tape therein.

19. An optical tag, comprising:
   a piezoelectric translator operative to generate a pulse when an optical energy at a predetermined wavelength is incident on the optical tag; and
   a retro-reflective tape in contact with the piezoelectric translator, the retro-reflective tape being operative to modulate phase of the optical energy according to the pulse generated by the piezoelectric translator and retro-reflect the modulated optical energy incident thereon.

20. The optical tag of claim 19, further comprising:
   a photo-detector operative to generate a photocurrent while receiving of the optical energy; and
   a controller, operative to receive the photocurrent and activate the piezoelectric translator.

21. The optical tag of claim 20, further comprising a battery connected to the piezoelectric translator when the controller receives the photocurrent.

22. The optical tag of claim 19, further comprising a Fresnel lens for focusing the optical energy on the retro-reflective tape.

23. The optical tag of claim 19, further comprising:
   an amplifier operative to amplify the photocurrent;
   an interface to decode data contained in the photocurrent; and
   a data retrieval device operative to retrieve the data.

24. The optical tag of claim 23, wherein the data retrieval device includes an earpiece.

25. The optical tag of claim 23, wherein the data retrieval device includes a display.

26. An interrogating system, comprising:
   an interrogating beam source, operative to scan an interrogating beam comprising an optical signal with a predetermined wavelength through a field; and
   an optical tag, operative to respond to the optical signal with an identification code, wherein the optical tag comprising:
      a piezoelectric translator, operative to generate a pulse for modulating the optical signal; and
      a retro-reflective tape, operative to modulate the optical signal with the identification code according to the pulse and retro-reflect the modulated optical signal back to the interrogating beam source.

27. The interrogating system of claim 26, wherein the interrogating beam source includes a laser beam source.

28. The interrogating system of claim 26, wherein the predetermined wavelength is about 1.55 µm.

29. The interrogating system of claim 26, wherein the interrogating beam source is placed in an airborne platform.

30. The interrogating system of claim 26, wherein the optical tag is mounted on a vehicle.

31. The interrogating system of claim 26, wherein the optical tag is held by a person.

32. A method of interrogating a target from an airborne platform, comprising:
   generating an optical signal at a predetermined wavelength;
   converting the optical signal into a photocurrent;
   generating a pulse in response to the photocurrent;
   modulating the optical signal with an identification according to the pulse; and retro-reflecting the modulated optical signal.

33. The method of claim 32, further comprising:
   providing a photo-detector to receive the optical signal and to generate the photocurrent;
   providing a piezoelectric translator activated by the photocurrent to generate the mechanical pulse; and
   providing a retro-reflective tape on the piezoelectric translator to modulate and retro-reflect the optical signal.

34. The method of claim 33, further comprising a step of connecting the piezoelectric translator to a battery to generate the pulse.

35. The method of claim 33, further comprising a step of varying the identification code of the target by changing material, thickness, and/or area of the piezoelectric translator.

36. The method of claim 33, further comprising a step of varying the identification code of the target by changing material, thickness, and/or area of the retro-reflective tape.

37. The method of claim 32, further comprising the steps of:
   decoding the photocurrent into readable data or audio format; and
   retrieving the data or information by a data retrieval device.

* * * * *